March 24, 1936. E. F. W. ALEXANDERSON Re. 19,896

CONTROL SYSTEM

Original Filed Jan. 15, 1926

Inventor:
Ernst F. W. Alexanderson,
by Harry E. Dunham
His Attorney.

Reissued Mar. 24, 1936

Re. 19,896

UNITED STATES PATENT OFFICE 19,896

CONTROL SYSTEM

Ernst F. W. Alexanderson, Schenectady, N. Y., assignor to General Electric Company, a corporation of New York Original No. 1,787,299, dated December 30, 1930, Serial No. 81,535, January 15, 1926. Application for reissue September 26, 1932, Serial No. 634,989

29 Claims. (Cl. 175—294)

Figure 1:
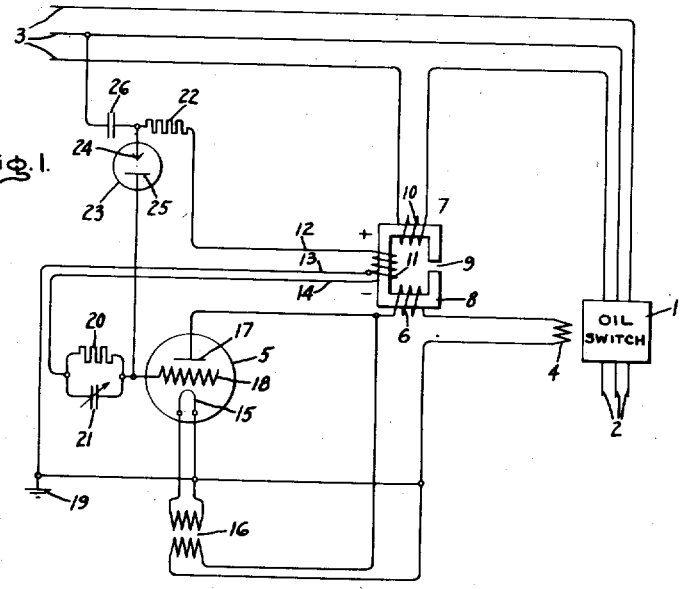

My invention relates to alternating current systems, and more particularly to such systems in which it is desired to obtain a response or a controlling action dependent upon the direction of energy flow in the circuit.

In various alternating current systems it is often desirable to obtain an indication or a controlling action responsive to the direction of energy flow in the alternating current circuit. For example, if a pair of alternating current circuits are interconnected through a circuit interrupting means and it is desired to transfer energy in only one direction, that is, from the first circuit to the second, it is desirable to operate the circuit interrupting means in response to a reversal in the direction of energy flow between the circuits. Heretofore there have been proposed several mechanical relays and controlling apparatus for securing this result but these arrangements have not been completely satisfactory. My invention relates more specifically to such alternating current systems in which a response or controlling action dependent upon the direction of energy flow in an alternating current circuit is obtained by means of an electric discharge device or valve.

It is an object of my invention, therefore, to provide an improved alternating current system including an alternating current circuit and means for obtaining a response or a controlling action upon the reversal of the direction of the flow of energy in the alternating current circuit.

It is another object of my invention to provide an improved alternating current system including a plurality of electric circuits interconnected through circuit interrupting means in which the circuit interrupting means will be opened in response to the reversal of the flow of energy between the circuits.

It is a further object of my invention to provide an improved alternating current system comprising a plurality of alternating current circuits interconnected through a circuit interrupting means in which the circuit interrupting means will be opened in response to the flow of reverse energy of a predetermined magnitude for a predetermined time interval.

In accordance with one embodiment of my invention a plurality of alternating current circuits are interconnected through circuit interrupting means and there is provided an electric valve for controlling the interconnecting means. Alternating potentials are impressed upon the grid and anode of the electric valve to maintain the valve normally non-conductive. A reversal in the direction of energy flow between the two alternating current circuits is effective to impress a positive bias on the grid to render the valve conductive to open the interconnecting means.

In accordance with one feature of my invention, a biasing condenser is included in the grid circuit of electric valves to provide a time delay between the reversal of energy between the alternating current circuits and the operation of the circuit interrupting means.

My invention will be better understood from the following description when considered in connection with the accompanying drawing and its scope will be pointed out in the appended claims.

Figure 2:
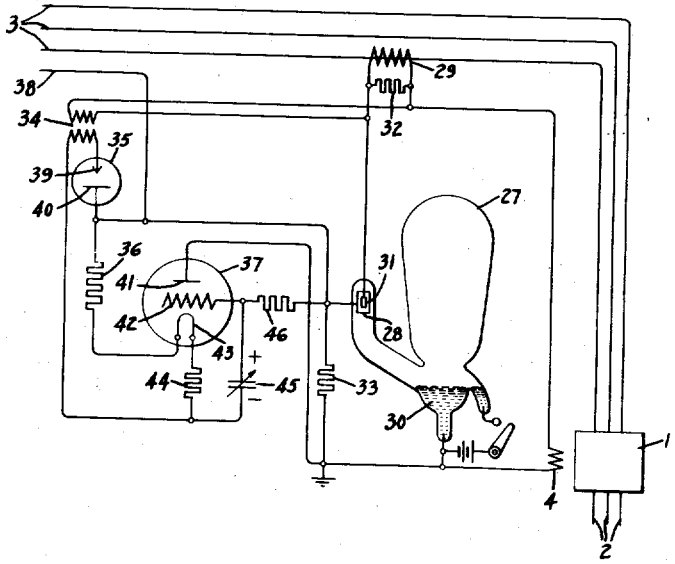

Referring to the drawing, Fig. 1 shows a switch control apparatus wherein my invention has been embodied; and Fig. 2 shows a modified embodiment of the invention.

Fig. 1 shows a switch 1 that is connected between two electrical circuits 2 and 3 and is provided with an operating coil 4 connected to an electron discharge device or electrical valve 5 through a secondary circuit 6 of a current transformer 7. The current transformer 7 comprises a core 8 provided with an air gap 9 for limiting its secondary voltage when its secondary circuits are interrupted, a primary circuit 10 which is connected in series with the circuit 3, and a secondary circuit 11 which is provided with terminals 12, 13 and 14. The device 5 comprises a cathode 15 which is supplied with heating current from the secondary circuit 6 through a transformer 16, an anode 17, and a control electrode or grid 18 for controlling the transmission of current between the cathode and anode.

The cathode 15 is grounded at 19 and is connected to the grid 18 through a circuit comprising terminal 13, a part of the secondary winding 11, terminal 14 and a time delay element comprising a resistor 20 and a condenser 21 which are connected in parallel with one another. Through this circuit an alternating potential in phase opposition to the alternating potential impressed upon the anode 17 of the valve 5 and of sufficient magnitude to maintain the valve 5 closed, is applied to the grid 18 so long as the current transmitted through the switch 1 to the circuit 3 does not exceed a predetermined value in a predetermined direction.

The time delay element comprising resistor 20 and condenser 21 is connected to the secondary winding 11 through terminals 12 and 14, a resistor 22, and a glow discharge device comprising electrodes 24 and 25 which begin to transmit current when they are subjected to a predetermined voltage. The resistor 22 is connected to one conductor of the circuit 3 through capacitance means shown as a condenser 26 and to another conductor of this circuit through the capacitance between this conductor and ground. It should be noted that the electron discharge device preferably contains mercury vapor or the like.

With the connections described, the valve 5 is maintained closed due to the alternating potential bias of the grid 18 so long as the potential applied to the electrodes 24 and 25 is insufficient to initiate the transmission of current through the glow discharge device 23. The voltage applied between the electrodes 24 and 25 is the resultant of two component voltages one of which has its value determined by the voltage of the circuit and the other of which has its value and polarity respectively determined by the magnitude and direction of the current transmitted through the circuit 3. The component voltage that is proportional to the circuit voltage is produced by current transmitted through a circuit comprising the condenser 26, resistor 22, the upper portion of secondary winding 11 and the capacitance between ground and the circuit conductor wherein the primary winding 10 is connected. The component voltage that varies in accordance with the magnitude and direction of the circuit current is produced through the secondary circuit 11.

When current is transmitted from the circuit 3 to the circuit 2, these component voltages tend to neutralize one another, the resultant voltage applied between the electrodes 24 and 25 is insufficient to initiate the transmission of current through device 23, and the valve 18 is maintained closed. When current is transmitted in the opposite direction, the resultant sum of the component voltages is applied to the electrodes 24 and 25. If the current of the circuit 3 exceeds a predetermined value the glow device 23 opens, the full potential of the winding 11 is impressed upon the time delay circuit comprising the resistor 20 and the condenser 21 through the current limiting resistor 22 and the glow device 23. The glow device 23 acts not only as a voltage responsive device but as a uni-laterally conductive device to charge up the condenser 21 with the terminal connected to the grid 18 positive. However, the impedance of this last described circuit limits the charging rate of the condenser 21 with the result that a predetermined time delay will be interposed between the reversal of energy between the circuits 2 and 3 and the impressing of a positive potential on the grid of the valve 5 to render the valve conductive. By properly selecting the constants of this time delay circuit, any predetermined delay may be obtained. Obviously as soon as the valve 5 becomes conductive the trip coil 4 of the oil switch will be energized from the secondary winding 6 of the transformer 7 to disconnect the circuits 2 and 3.

The modification shown by Fig. 2 differs from that just described in that the valve 5 is replaced by a mercury arc valve device 27 comprising a grid or control electrode 28 for controlling the current supplied from the current transformer 29 to the switch operating coil 4 through a cathode 30 and an anode 31 of the device 27. A resistor 32 is connected between the secondary terminals of the transformer 29 for preventing an excessive voltage increase when the transformer is not supplying current to the control apparatus.

The grid potential of the device 27 is determined by the voltage drop of a resistor 33 which is connected between the grid 28 and cathode 30, and is connected to the secondary circuit of the current transformer 29 through a potential transformer 34, a glow discharge device 35, a resistor 44 and a vacuum valve device 37, and is connected to one conductor of the circuit 3 through the capacitance between this conductor and the ground and to another of the circuit conductors through a capacitance means 38 shown as a conductor located near the circuit conductor. The glow discharge device includes electrodes 39 and 40. The vacuum device 37 includes an anode 41. It also includes a grid 42 and a cathode 43 which are interconnected through parallel circuits one of which includes a resistor 44 and a condenser 45 for producing a time delay between opening of the valve devices 37 and 27 and the other of which includes a resistor 46 which completes a path for supplying charging current to the condenser 45. With these connections, component voltages dependent respectively on the circuit voltage and on the direction and magnitude of the circuit current are applied to the resistor 33.

When current is transmitted from the circuit 3 to the circuit 2, these component voltages tend to neutralize one another and the potential applied to the grid 28, while the anode potential is positive, is insufficient to produce opening of the valve 27. The component voltage produced in the resistor 33 by reason of its connection between ground and the capacitance device 38 is insufficient alone to produce opening of the valve 27. When current exceeding a given value is transmitted between the circuits in the opposite direction, however, the voltage applied to the electrodes 39 and 40 is raised to a point at which the device 35 begins to transmit current, heating current is supplied through the device 35 and resistors 36 and 44 to the cathode 43, charging current is supplied to the condenser 45 through a circuit including the resistor 46, the potential of the grid 42 is changed at a rate dependent on the charging rate of the condenser 45, the device 37 is opened, the resultant sum of the component voltages is applied to the resistor 33 and the potential of the grid 28 during the interval that the anode 31 is positively charged is raised to a point at which the device 27 is opened and the operating coil 4 is energized. The time interval between opening of the devices 35 and 37 may be of course determined by adjustment of the condenser 45.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:

1. The combination of a circuit, an electrical valve including a grid for controlling the transmission of current between its cathode and anode, means for producing component voltages respectively proportional to the voltage and current of said circuit, a circuit to which said voltages are applied and voltage responsive means in said voltage circuit operable to change the potential of said grid only when the resultant sum of said component voltages exceeds a predetermined value.

2. The combination of a circuit, an electrical valve including a grid for controlling the transmission of current between its cathode and anode, means for producing component voltages respectively proportional to the voltage and current of said circuit, a circuit to which said voltages are applied, and voltage responsive means connected between said grid and said voltage circuit for causing said valve to be opened only when the resultant sum of said component voltages has been maintained above a predetermined value for a definite interval of time.

3. The combination of a circuit, an electrical valve including a grid for controlling the transmission of current between its cathode and anode, means for producing component voltages respectively proportional to the voltage and current of said circuit, a circuit to which said voltages are applied, a circuit connected between said cathode and grid for applying a negative bias potential to said grid, a time delay element connected in the circuit of said grid, and voltage responsive means in said voltage circuit operable to apply a positive potential to said grid through said time delay element only when the resultant sum of said component voltages exceeds a predetermined value.

4. The combination of a circuit, an electrical valve including a grid for controlling the transmission of current between its cathode and anode, means for producing component voltages respectively proportional to the voltage and current of said circuit, a circuit to which said voltages are applied, a time delay element connected between said grid and cathode, and voltage responsive means connected between said element and said voltage circuit for changing the potential of said grid when the resultant sum of said voltages exceeds a predetermined value.

5. The combination of a circuit, an electrical valve including a grid for controlling the transmission of current between its cathode and anode, means for producing component voltages respectively proportional to the voltage and current of said circuit, a time delay element comprising a resistor and condenser connected in parallel between said cathode and grid, and a circuit comprising a glow discharge device connected between said voltage producing means and said element for changing the potential of said grid at a rate dependent on the capacity of said condenser.

6. The combination of an electron discharge device including a grid for controlling the transmission of current between its cathode and anode, negative bias means connected between said grid and cathode, a time delay element comprising a resistor and a condenser connected in parallel between said cathode and grid, and means including a glow discharge device for applying to said grid a positive potential which increases at a rate dependent on the capacity of said condenser.

7. The combination of an electron discharge device including a grid for controlling the transmission of current between its cathode and anode, negative bias means connected between said grid and cathode, a time delay element comprising a resistor and a condenser connected in parallel between said cathode and grid, and means operable only in response to a voltage exceeding a predetermined value for applying to said grid a positive potential which changes at a rate dependent on the capacity of said condenser.

8. The combination of a plurality of circuits, means for interconnecting said circuits, an electric valve including a cathode and anode connected to said interconnecting means and a grid for controlling the transmission of current between said cathode and anode, and voltage responsive means connected between said cathode and grid for causing said valve to be opened only when power of a predetermined value has been transmitted between said circuits during a definite interval of time.

9. The combination of a plurality of circuits, means for interconnecting said circuits, an electric valve including a cathode and anode connected to said interconnecting means and a grid for controlling the transmission of current between said cathode and anode, means for producing component voltages respectively proportional to the voltage and current of one of said circuits, and means connected between said cathode and grid for causing said valve to be opened only when the resultant sum of said component voltages exceeds a predetermined value, said means including a second electric valve responsive to a predetermined voltage to transmit current, and a circuit through which said current and voltage are applied to said valve.

10. An alternating current system comprising an alternating current circuit, and relay means including an electric discharge device provided with a grid circuit responsive to only one direction of the flow of energy in said alternating current circuit.

11. An alternating current system comprising an alternating current power circuit, and means including an electric discharge device provided with a grid circuit responsive to a predetermined direction of the flow of energy in said power circuit for controlling said circuit.

12. An alternating current system comprising an alternating current power circuit, a grid controlled electric valve for controlling said power circuit, and means for exciting the grid of said valve in accordance with the direction of the flow of energy in said power circuit.

13. An alternating current system comprising an alternating current power circuit, and an electric discharge device having a grid control circuit excited in response to the phase relation between the current and voltage of said power circuit.

14. An alternating current system comprising an alternating current power circuit, a grid controlled electric valve for controlling said power circuit, and means for exciting the grid of said valve in accordance with the phase relation between a voltage and a current of said power circuit.

15. An alternating current system comprising an alternating current power circuit and circuit interrupting means, a grid controlled electric valve for controlling said circuit interrupting means, and means for controlling the grid of said electric valve in accordance with the direction of energy flow in said alternating current circuit.

16. An alternating current system comprising an alternating current power circuit and circuit interrupting means, an electric valve for controlling said circuit interrupting means, and means responsive to a flow of energy in said power circuit of predetermined magnitude and direction for changing the conductivity of said valve.

17. An alternating current system comprising an alternating current power circuit and circuit interrupting means, an electric valve for controlling said circuit interrupting means, and means responsive to a flow of energy in said power circuit in a predetermined direction and for a predetermined time interval for changing the conductivity of said valve.

18. An alternating current system comprising a plurality of alternating current circuits, means for interconnecting said circuits, an electric valve for controlling said interconnecting means, means for impressing potentials upon said valve thereby normally maintaining said valve non-conductive, and means responsive to a reversal in the direction of energy flow between said circuits for rendering said valve conductive to open said interconnecting means.

19. An alternating current system comprising a plurality of alternating current circuits, means for interconnecting said circuits, an electric valve for controlling said interconnecting means, means for normally maintaining said valve non-conductive, and means responsive to the reversal in the direction of energy flow between said circuits for a predetermined time interval for rendering said valve conductive to open said interconnecting means.

20. An alternating current system comprising an alternating current circuit, relay means including an electric valve provided with an anode, a cathode, and a control grid, means for impressing upon said anode a control potential for determining its conductivity, and means responsive to the direction of the flow of energy in said alternating current circuit for modifying said control potential to change the conductivity of said valve.

21. An alternating current system comprising an alternating current circuit, controlling means for said circuit including an electric valve provided with an anode, a cathode, and a control grid, means for impressing on said grid and anode alternating potentials substantially in phase opposition to maintain said valve non-conductive, and means responsive to a reversal in the direction of energy flow in said circuit for modifying the potential of said grid to render said valve conductive.

22. An alternating current system comprising a plurality of alternating current circuits, means for interconnecting said circuits, controlling means for said interconnecting means including an electric valve provided with an anode, a cathode, and a control grid, means for normally impressing on said grid and anode alternating potentials substantially in phase opposition to maintain said valve non-conductive, and means responsive to a reversal in the direction of energy flow between said circuits for impressing a positive bias upon said grid to render said valve conductive.

23. A protective system for electical circuits comprising an electro-ionic relay energized therefrom, means for controlling said relay in accordance with the direction of the flow of energy in said circuit, means for imparting a time-element to the operation of said relay and a device controlled by said relay.

24. In an alternating-current system having a circuit interrupter therein, protective means therefor including electronic means electrically associated with said system and said interrupter and means for effecting the energization of said electronic means in accordance with more than one electrical quantity in said system.

25. In an alternating-current protective system having a circuit interrupter therein, in combination, electronic means electrically associated with said system and said interrupter and means associated with said system and said electronic means for effecting the energization of said electronic means in accordance with the system current and voltage.

26. In an alternating-current system, electronic means electrically associated therewith, and means energized in accordance with more than one electrical quantity in said system for controlling the effective energization of said electronic means.

27. In an alternating-current protective system having a circuit interrupter therein, an electronic impedance relay means, means associated with said circuit and said relay means for effecting the energization of said relay means in accordance with the current and voltage in said system and means controlled in accordance with a predetermined energization of said relay means for effecting the actuation of said circuit interrupter.

28. In an alternating-current system having a circuit interrupter therein, protective means therefor including in combination an electronic means, means associated with said system and said electronic means for effecting the energization of said electronic means in accordance with more than one electrical quantity in said system and means responsive to the operative energization of said electronic means for effecting the actuation of said circuit interrupter upon the occurrence of a predetermined fault or abnormal system condition.

29. In a protective system for an electrical circuit, electronic means energized from said circuit, means for controlling the effective energization of said electronic means in accordance with the direction of energy flow in said circuit, means for imparting a time-element to the operation of said electronic means and means controlled by said electronic means in accordance with a predetermined magnitude of energization of said electronic means.

ERNST F. W. ALEXANDERSON.